United States Patent [19]

Kasahara et al.

[11] Patent Number: 4,835,582

[45] Date of Patent: May 30, 1989

[54] DEVICE FOR DRIVING A PHOTOCONDUCTIVE ELEMENT OF AN ELECTROPHOTOGRAPHIC COPIER ETC.

[75] Inventors: Nobuo Kasahara; Toshio Nakahara, both of Yokohama, Japan

[73] Assignee: Ricoh Company, Ltd., Tokyo, Japan

[21] Appl. No.: 128,924

[22] Filed: Dec. 4, 1987

Related U.S. Application Data

[63] Continuation-in-part of Ser. No. 113,479, Oct. 28, 1987.

[30] Foreign Application Priority Data

| | | | |
|---|---|---|---|
| Oct. 28, 1986 | [JP] | Japan | 61-164184[U] |
| Dec. 5, 1986 | [JP] | Japan | 61-186875[U] |
| Dec. 25, 1986 | [JP] | Japan | 61-202741[U] |

[51] Int. Cl.$^4$ .................... H02K 5/24; G03G 15/00

[52] U.S. Cl. .................... 355/3 DR; 310/51; 355/3 R

[58] Field of Search .............. 355/3 DR, 3 R, 3 DD; 310/51

[56] References Cited

U.S. PATENT DOCUMENTS

| | | | |
|---|---|---|---|
| 4,120,576 | 10/1978 | Babish | 355/3 DR |
| 4,299,474 | 11/1981 | Ernst et al. | 355/3 DR |
| 4,319,829 | 3/1982 | Janeway, III et al. | 355/3 DR X |
| 4,527,883 | 7/1985 | Kamiyama | 355/3 DR |
| 4,714,337 | 12/1987 | Nishino et al. | 355/3 DR |

FOREIGN PATENT DOCUMENTS

| | | | |
|---|---|---|---|
| 117267 | 9/1981 | Japan | 355/3 DR |
| 143368 | 8/1983 | Japan | 355/3 DR |
| 250377 | 12/1985 | Japan | 355/3 DR |

*Primary Examiner*—Arthur T. Grimley
*Assistant Examiner*—Edward Pipala
*Attorney, Agent, or Firm*—Oblon, Fisher, Spivak, McClelland & Maier

[57] ABSTRACT

A device for driving a photoconductive drum of an electrophotographic copier and others is operable without the need for gears, a toothed belt and other transmission mechanisms. An outer roller type drive motor is interposed between the drum and a drum support shaft such that an outer wheel portion of the motor drives the drum by way of an engaging member. Those members with which the body of the motor and that of the copier are engaged are made of a vibration-damping material. Tapered portions which are axially movable into and out of contact with each other are provided in a drive transmitting section with which an output portion of the motor and one end of the drum are engageable. Pressing means for causing one end of the drum into contact with the outer wheel portion of the motor through the tapered portions is provided at the other end of the drum.

26 Claims, 3 Drawing Sheets

DEVICE FOR DRIVING A PHOTOCONDUCTIVE ELEMENT OF AN ELECTROPHOTOGRAPHIC COPIER ETC.

CROSS REFERENCE TO RELATED APPLICATION

This application is a continuation-in-part of copending U.S. patent application Ser. No. 113,479, filed Oct. 28, 1987.

BACKGROUND OF THE INVENTION

The present invention relates to a device for driving a photoconductive element which is installed in an electrophotographic copier, particularly a color electrophotographic copier, and to a mechanism for supporting the photoconductive element.

Today, there is extensively used an electrophotographic copier in which a transfer roller is pressed against a photoconductive drum to transfer from the drum to a paper sheet a toner image which has been produced on the drum by developing an electrostatic latent image, especially a color electrophotographic copier which repeats such image transfer a certain number of times corresponding to the number of colors separated. Specifically, in a color electrophotographic copier, a photoconductive drum and a transfer drum are each rotated a predetermined number of times which is equal to the number of colors separated. This allows toner images sequentially formed on a photoconductive drum and each associated with a different color to be transferred one upon another on a paper sheet, thereby reproducing a predetermined color image. To insure register of the colors, a gear is mounted on one end of each of the two drums, and these two gears are held in mesh with each other. A drive motor mounted in a body of the copier to serve as a drive source is operatively connected to one of the gears by a transmission mechanism which includes a timing belt, whereby the rotations of the two drums are synchronized to each other.

A drawback with such an intermeshing gear scheme is that backlash is apt to occur between the two gears to invite vibrations of the drums, causing the toner images of different colors to be out of register with each other. Another drawback is that, since a plurality of transmitting means which include a timing belt are used, the arrangement is complicated, the torque is apt to fluctuate, the durability is limited, and, therefore, quality image reproduction is not attainable.

In the light of this, there has been proposed a drive system in which an outer rotor type drive motor or the like is mounted in each of the photoconductive and transfer drums. This type of system, however, has both advantages and disadvantages. Specifically, one advantage is that, since the drive sources associated with the drums are independent of each other, the color-by-color operation does not have to be associated with one rotation of the photoconductive drum and, hence, the period of time necessary for copying is reduced. A disadvantage is that the driving devices which are built in the drums cannot be maintained, assembled or adjusted without time- and labor-consuming work. Another disadvantage is that the outer rotor type motor has to be rigidly supported to prevent its vibrations due to rotation from affecting the copier body, resulting in an increase in cost.

OBJECTS OF THE INVENTION

It is, therefore, a primary object of the present invention to eliminate the drawbacks particular to the prior art device for driving a photoconductive element which is installed in an electrophotographic copier and others.

It is another object of the present invention to provide a device for driving a photoconductive element which is installed in an electrophotographic copier, particularly one which is driven by an outer rotor type drive motor, capable of preventing the vibrations of the motor from being imparted to a body of the copier.

It is another object of the present invention to provide a device for driving a photoconductive element installed in a copier and others which is operable with high accuracy and reliability despite the use of a small number of parts.

It is another object of the present invention to provide a device for driving a photoconductive element installed in a copier and others which allows the element to be readily mounted and dismounted from the device.

It is another object of the present invention to provide a generally improved device for driving a photoconductive element installed in a copier and others.

SUMMARY OF THE INVENTION

A device for driving a photoconductive element which is installed in an electrophotographic recording equipment together with a shaft rotatably supporting the photoconductive element of the present invention comprises a rotary member rotatably mounted on the shaft which supports the photoconductive element. A motor having an inner wheel portion and an outer wheel portion which is rotatable relative to the inner wheel portion is fixed to the rotary member.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

While the present invention is applicable to various kinds of electrostatic recording equipment having a photoconductive element which serves to carry an electrostatic latent image, it will be described in relation to a color electrophotographic copier by way of example.

Figure 1:
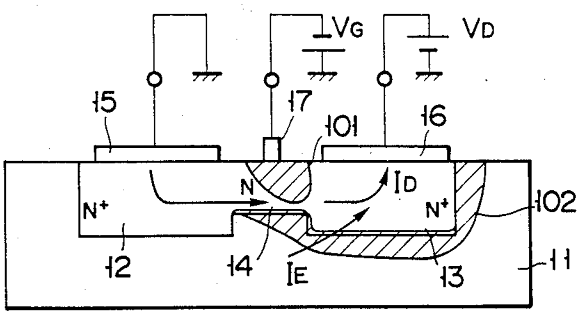
PRIOR ART FIG. 1
FIG. 1 is a vertical section showing the overall construction of a color electrophotographic copier to which a device for driving a photoconductive element in accordance with the present invention is applicable.

Referring to FIG. 1, a color electrophotographic copier 10 includes a photoconductive drum 12 and a lamp 14. Light issuing from the lamp 14 is reflected by a document to become incident to the drum 12 through a lens 16 and a color separating filter 18. Arranged around the drum 12 are a charger 20, a discharger 22, an eraser 24, a magenta developing unit 26, a cyan developing unit 28, a yellow developing unit 30, a pretransfer charger 32, a transfer drum 34, a transferring station 36, a separating station 38, a precleaning charger 40, and a cleaning station 42. A magenta, a cyan and a yellow image are sequentially formed on the drum 12 and, then, sequentially transferred to a paper sheet in register with each other, the paper sheet being fed from a sheet feed section 44. Subsequently, the paper sheet is transported to a tray 48 by way of a fixing section 46.

Figure 2A:
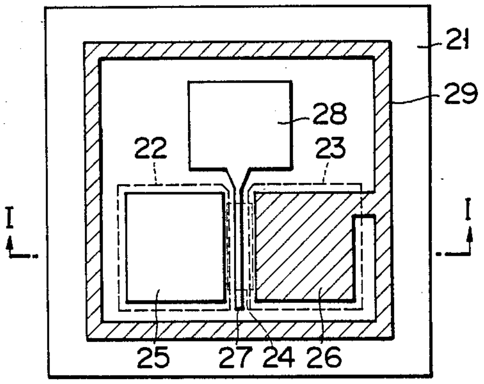
FIGS. 2 and 3 are views each showing a different example of prior art devices for driving a photoconductive element.
Figure 2B:
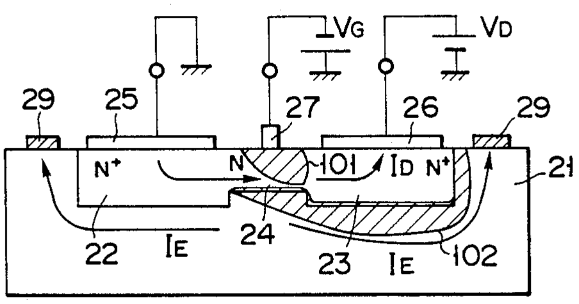

FIG. 2 shows a prior art system for driving the photoconductive drum 12 of the color copier 10. As shown, a main motor 50 is mounted in the copier body and operatively connected to the photoconductive drum 12 and the transfer drum 34 through drive transmitting means which is made up of a timing belt 52, a pulley 54, a gear 56, a gear 58 mounted on the drum 12, and a ring gear 60 mounted on the transfer drum 34. This kind of drive transmitting mechanism suffers from a drawback that the photoconductive drum 12 is caused to vibrate due to the vibrations of the various transmitting sections, the fluctuation of torque and other causes, disturbing an image to be formed on the drum 12.

Figure 3:
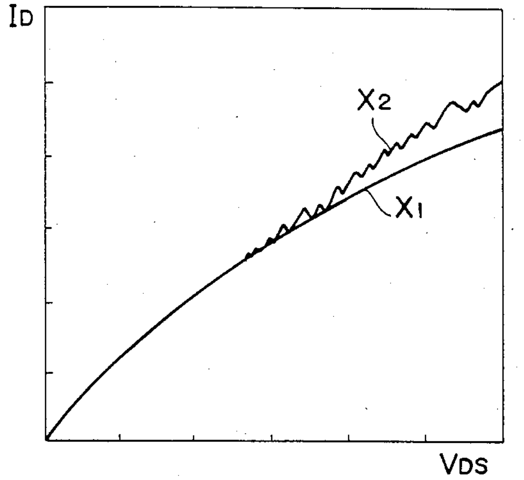
Figure 4A:
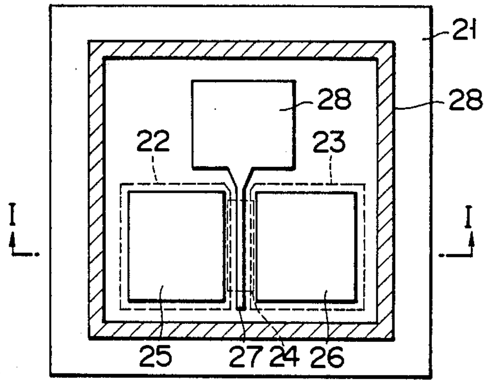
FIG. 4 is a vertical section showing a device embodying the present invention.
Figure 4B:
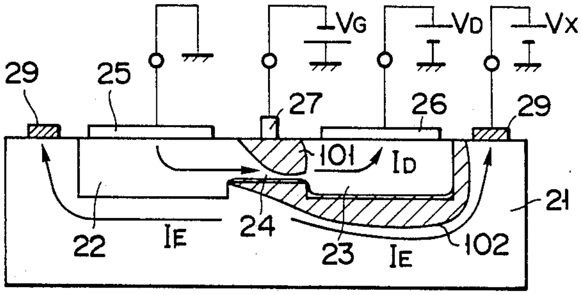
Figure 6B:
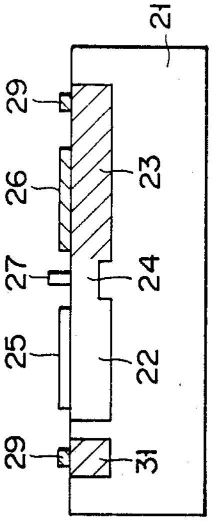
Figure 6A:
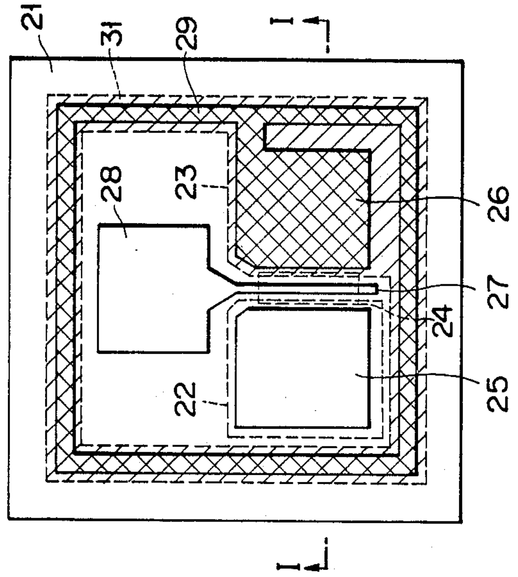
Figure 7B:
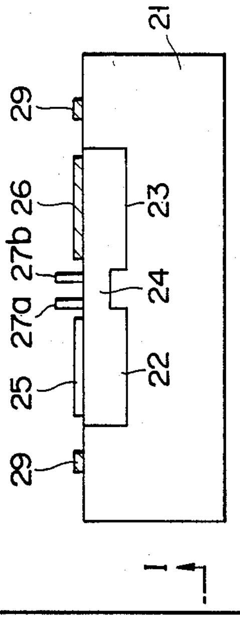
Figure 7A:
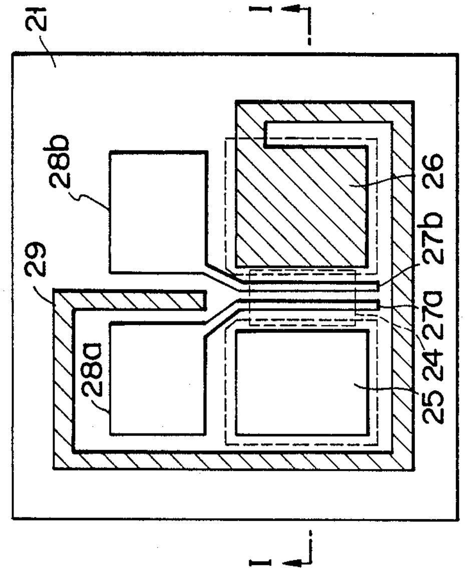
Figure 3:
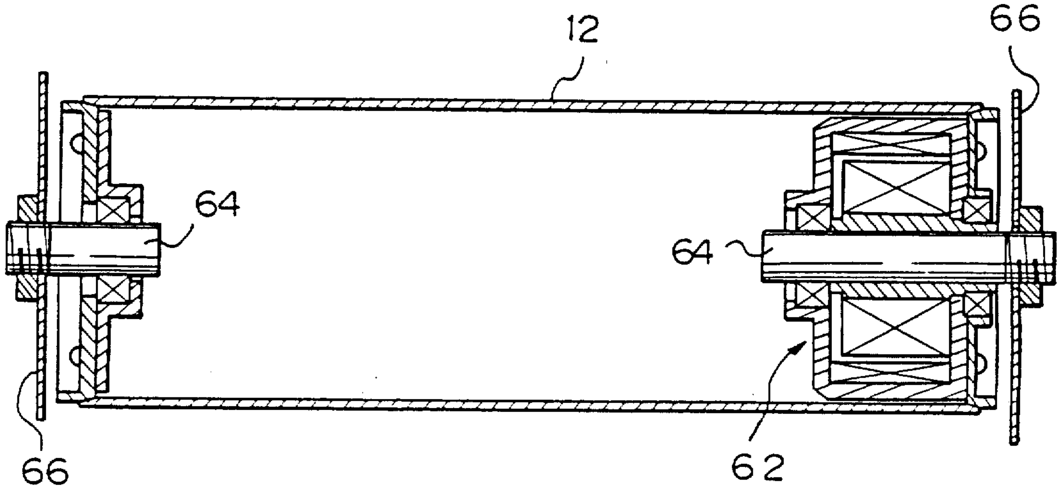

FIG. 3 shows another prior art drive system which is elaborated to solve the above-stated problem. As shown, the drive system of FIG. 3 uses an outer rotor type drive motor 62 for driving the photoconductive drum 12. A prerequisite with such a drive system is that the motor 62 be rigidly supported in order to prevent its vibrations from being imparted to the photoconductive drum 12. To meet this prerequisite, supports 66 adapted to support drum shafts 64 have to be implemented with highly rigid aluminum moldings or the like.

Figure 4:
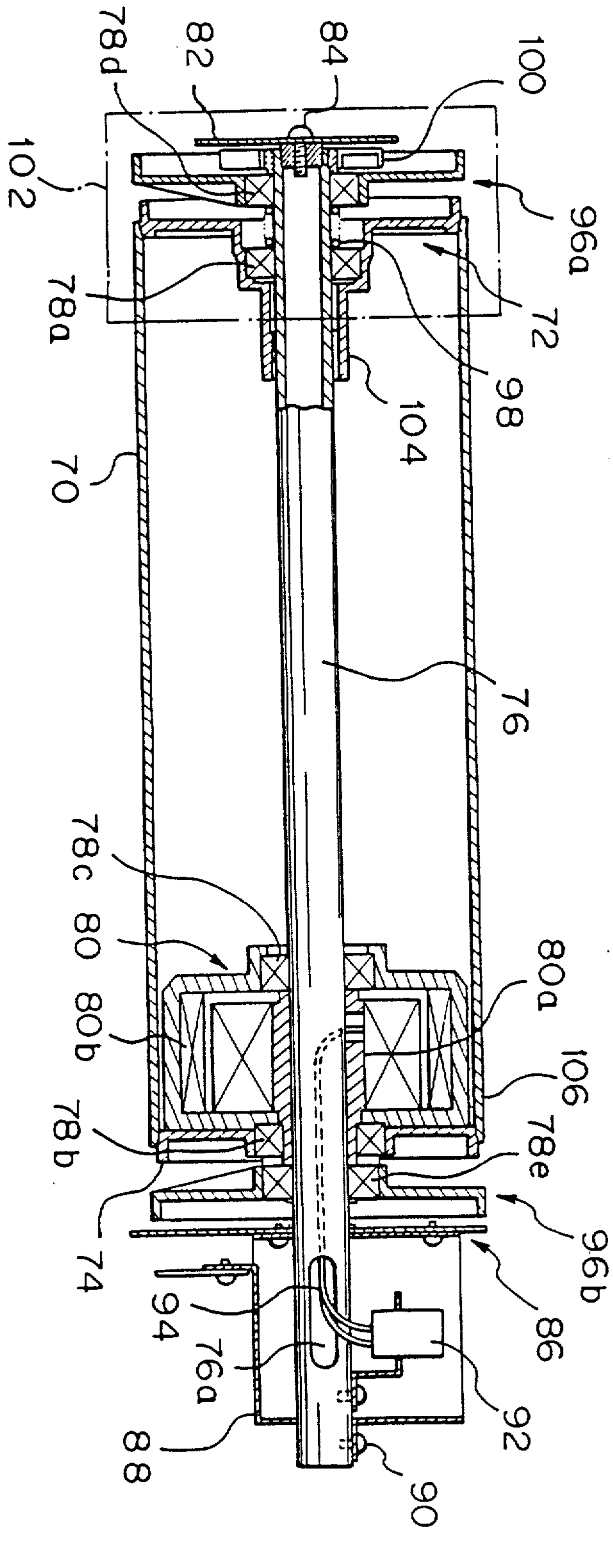

Referring to FIG. 4, a device for driving a photoconductive element embodying the present invention and which uses an outer rotor type motor is shown. This embodiment is applicable to, for example, a color copier as shown in FIG. 1. In FIG. 4, a photoconductive drum 70 is provided with a front flange 72 and a rear flange 74 at its left and right ends, respectively. The drum 70 is rotatably supported by bearings 78*a* and 78*b* which are provided on a drum support shaft 76. An outer rotor type drive motor 80 is disposed inward of the rear flange 74 and between the shaft 76 and the inner periphery of the drum 70. The motor 80 includes an inner wheel portion, or stator, 80*a* which is press-fitted, keyed or otherwise fixed to the shaft 76. The motor 80 also includes an outer wheel portion, or rotor, 80*b* which is rotatably supported by a bearing 78*c* which s in turn provided on the shaft 76. A part of the outer wheel portion 80*b* is pressed against the inner surface of the rear flange 74 so that the rotation of the motor 80 is transmitted to the drum 70 through the rear flange 74.

The drum support shaft 76 carrying the motor inner wheel portion 82*a* therewith is fixed at its left end to a support plate 82 by a screw 84, the support plate 82 being mounted to a side panel (not shown) of the copier body. the right end of the shaft 76 is fixed to a photoconductive drum unit support 88 by a screw 90, while the support 88 is mounted to a side panel 86 of the copier body. An electrical signal input connector 92 is mounted on the photoconductive drum unit support 88 for delivering a control signal to the motor 80. Leads 94 extending from the connector 92 are connected to the motor inner wheel portion 80*a* extending through the interior of the drum support shaft 76.

At both sides of the photoconductive drum 70, spacer rings 96a and 96*b* are rotatably supported by bearings 78*d* and 78*e* which are provided on the drum support shaft 76. The spacer rings 96*a* and 96*b* are adapted to define a positional relationship between the photoconductive drum 70 and a transfer drum of the color copier. A compression spring 98 is preloaded between the spacer ring 96*a* and the front flange 72 of the drum 70. A presser handle 100 is provided on the opposite side of the spacer rings 96*a* from the compression spring 98. The presser handle 100 serves to urge the rear end (right end as viewed in FIG. 4) of the drum 70 toward the rear flange 74 against the action of the compression spring 98. Specifically, a single means for pressing the drum 70 is provided in the front end portion of the drum 70, as indicated by a dash-and-dot line in FIG. 4.

In operation, the outer wheel portion 80*b* of the outer rotor type drive motor 80 is controllably rotated in response to an electrical signal which is fed from a sequence control circuit built in the copier body to the motor 80 via the connector 92 and the leads 94. The motor 80 vibrates as it is caused to rotate. In accordance with the present invention, the stationary portion of the motor 80 and those members which are directly engaged with the motor 80 (i.e., the motor inner wheel portion 80*a*, the drum support shaft 76, and the rear flange 74) are either entirely or partly made of a vibration-damping material. Hence, vibrations due to the rotation of the motor 80 are absorbed by the motor inner wheel portion or stator 80*a*, the shaft 76, and the rear flange 74 (which is engaged with the motor outer wheel portion 80b), whereby the vibrations are prevented from being imparted to the copier body and to the drum 70.

Further, in accordance with the present invention, those portions which interconnect the motor 80 and the copier body (i.e., the photoconductive unit support 88 and the support plate 82, to which the opposite ends of the drum support shaft 76 are mounted) are made of a vibration-damping material in order to eliminate resonance of the vibrations due to the rotation of the motor 80 and the copier body. This prevents vibrations generated by the rotation of the motor 80 from resonating with the copier body and, thereby, frees various portions supported by the copier body from adverse influence of such vibrations.

The vibration-damping material stated above may advantageously be implemented with Vibless (tradename) available from Nippon Steel Corporation, Silentalloy (tradename) available from Toshiba, Damplay (tradename) available from Kobe Steep Ltd., or Calma (tradename) available from Nippon Kokan K.K. Such a vibration-damping material is constituted by two steel sheets with a thin viscous and elastic high polymer sandwitched therebetween and serves to absorb vibration energy while, at the same time, reducing noise.

Figure 5B:
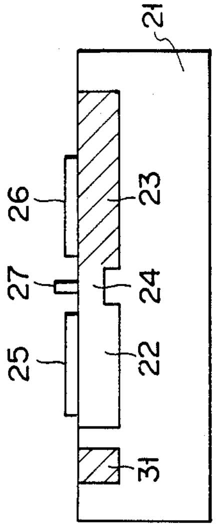
FIG. 5 is a fragmentary enlarged section of the device shown in FIG. 4.
Figure 5A:
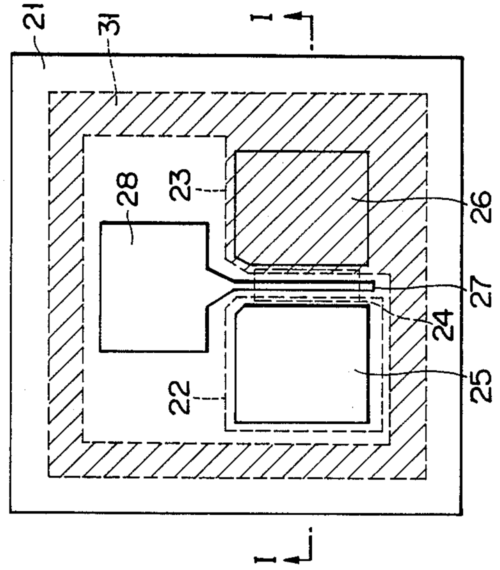
Figure 5:
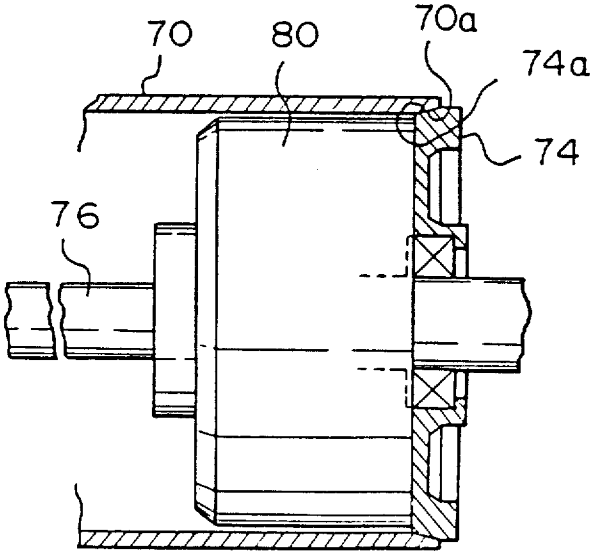

As regards the engagement between the rear end of the drum 70 and the rear flange 74, as shown in FIG. 5, the rear end 70*a* of the drum 70 and the outer periphery of the associated end of the rear flange 74 are tapered in a complementary configuration so as to make surface-to-surface contact. In this construction, when the drum rear end 70*a* is pressed against the rear flange end 74*a*, the two members are rotatable integrally with each other; when the drum 70 is pulled out in the axial direction until its rear end 70*a* becomes clear of the flange end 74*a*, the transmission of torque therebetween is interrupted.

To assemble and adjust the photoconductive drum 70, the drum support shaft 76 is inserted in the drum 70 together with the motor 80 until the drum rear end 70*a* and the flange rear 74a abut against each other. After the assembly and adjustment of the drum support shaft 76, the presser handle 100 is tightened against the action of the spring 98 so that the drum rear end 70a and the flange end 74a are pressed against each other at their tapered surfaces. In this condition, an intense frictional force acts between the tapered surfaces of the drum rear end 70a and the flange rear 74a. Therefore, the driving force output of the motor 80 is surely transmitted to the drum 70 without any loss by way of those tapered surfaces. This eliminates the deviation of colors when a color image is reproduced. Furthermore, since the drum 70 and the rear flange 74 are simply pressed against each other, the drum 70 can be readily pulled out in the axial direction simply by loosening the presser handle 100. Hence, centering and other kinds of work inherent in inspection, maintenance and assembly are facilitated.

In summary, it will be seen that the present invention provides an accurate and reliable drive for driving a photoconductive element, at a low cost.

Further, in accordance with the present invention, vibrations of an outer rotor type drive motor are intercepted by a simple construction (i.e., by a vibration-damping material) which is located at a predetermined position of a route which extends from the motor to a copier body.

In addition, in accordance with the present invention, the assembly, adjustment, maintenance and others of a photoconductive element are facilitated.

Various modifications will become possible for those skilled in the art after receiving the teachings of the present disclosure without departing from the scope thereof.

What is claimed is:

1. Electrophotographic recording equipment comprising:

(a) a photoconductive element;

(b) a shaft rotatably supporting said photoconductive element;

(c) a rotary member rotatably mounted on said shaft; and (d) a motor having an inner wheel portion and an outer wheel portion which is rotatable relative to said inner wheel portion, said outer wheel portion being fixed to said rotary member, wherein said shaft, said inner wheel portion, and said rotary member are made of a vibration-damping material.

2. Electrophotographic recording equipment as claimed in claim 1, wherein said motor comprises a motor cover which is fixed to said outer wheel portion.

3. Electrophotographic recording equipment as claimed in claim 2, wherein said rotary member comprises one of opposite flanges, said rotary member being detachably engaged with one end of said photoconductive element and being fixed to said motor cover.

4. Electrophotographic recording equipment as claimed in claim 1, wherein said shaft is hollow, electrical cords for driving said motor being received in said shaft.

5. Electrophotographic recording equipment as claimed in claim 1, wherein said rotary member comprises one of opposite flanges, said rotary member being detachably engaged with one end of said photoconductive element.

6. Electrophotographic recording equipment as claimed in claim 5, wherein said rotary member is fixed to a cover of said motor.

7. Electrophotographic recording equipment as claimed in claim 5, wherein said one end of said photoconductive element and an outer periphery of an end of said one of opposite flanges are tapered in a complementary configuration.

8. Electrophotographic recording equipment as claimed in claim 7, and further comprising pressing means for pressing said one end of said photoconductive element and said outer periphery of said end of said one of opposite flanges into contact with each other.

9. Electrophotographic recording equipment comprising:

(a) a photoconductive element;

(b) a shaft rotatably supporting said photoconductive element;

(c) a rotary member rotatably mounted on said shaft;

(d) a motor having an inner wheel portion and an outer wheel portion which is rotatable relative to said inner wheel portion, said outer wheel portion being fixed to said rotary member;

(e) a photoconductive unit support engaged with said shaft; and (f) a support plate supporting said shaft, wherein members with which said motor is engaged are made of a vibration-damping material.

10. Electrophotographic recording equipment as claimed in claim 9, wherein said members include said photoconductive unit support and said support plate.

11. Electrophotographic recording equipment as claimed in claim 9, wherein said motor comprises a motor cover which is fixed to said outer wheel portion.

12. Electrophotographic recording equipment as claimed in claim 11, wherein said rotary member comprises one of opposite flanges, said rotary member being detachably engaged with one end of said photoconductive element and being fixed to said motor cover.

13. Electrophotographic recording equipment as claimed in claim 9, wherein said shaft is hollow, electrical cords for driving said motor being received in said shaft.

14. Electrophotographic recording equipment as claimed in claim 9, wherein said one end of said photoconductive element and an outer periphery of an end of said one of opposite flanges are tapered in a complementary configuration.

15. Electrophotographic recording equipment as claimed in claim 14, and further comprising pressing means for pressing said one end of said photoconductive element and said outer periphery of said end of said one of opposite flanges into contact with each other.

16. A device for driving a photoconductive element which is installed in an electrophotographic recording equipment together with a shaft rotatably supporting said photoconductive element, comprising:

(a) a rotary member rotatably mounted on said shaft which supports said photoconductive element;

(b) a motor having an inner wheel portion and an outer wheel portion which is rotatable relative to said inner wheel portion and fixed to said rotary member, wherein:

(c) said shaft is hollow;

(d) electrical cords for driving said motor are received in said shaft;

(e) a driven member in the form of an image carrier is removable from a driving member comprising one of said shaft, said motor, and a flange;

(f) said shaft is longer than said drum; and (g) said flange is coaxial with said shaft.

17. As device as claimed in claim 16, wherein said motor comprises a motor cover which is fixed to said outer wheel portion.

18. A device as claimed in claim 17, wherein said rotary member comprises one of opposite flanges which is detachably engaged with one end of said photoconductive element, said one flange being fixed to said motor cover.

19. A device as claimed in claim 16, wherein members with which said motor and said copier are engaged are made of a vibration-damping material.

20. A device as claimed in claim 19, wherein said members include said shaft, said inner wheel portion, and said rotary member.

21. A device as claimed in claim 20, wherein said rotary member which constitutes one of said members comprises one of opposite flanges which is detachably engaged with one end of said photoconductive element.

22. A device as claimed in claim 20, further comprising a photoconductive unit support engaged with said shaft, and a support plate supporting said shaft.

23. A device as claimed in claim 22, wherein said members include said photoconductive unit support and said support plate.

24. A device as claimed in claim 16, wherein said rotary member comprises one of opposite flanges which is detachably engaged with one end of said photoconductive element.

25. A device as claimed in claim 24, wherein said one end of said photoconductive element and an outer periphery of an end of said flange which is detachably engaged with said one end of said photoconductive element are tapered in a complementary configuration.

26. A device as claimed in claim 25, further comprising pressing means for causing said one end of said photoconductive element and said outer periphery of said end of said flange which are tapered into contact with each other.

* * * * *

UNITED STATES PATENT AND TRADEMARK OFFICE
CERTIFICATE OF CORRECTION

PATENT NO. : 4,835,582

DATED : May 30, 1989

INVENTOR(S) : Nobuo KASAHARA, et al

It is certified that error appears in the above-identified patent and that said Letters Patent is hereby corrected as shown below:
The title page should be deleted to appear as per attached title page.

The drawings in the Letters Patent are incorrect. Such drawings should be deleted and the attached drawings should appear in their place.

Signed and Sealed this

Twentieth Day of March, 1990

*Attest:*

JEFFREY M. SAMUELS

*Attesting Officer*

*Acting Commissioner of Patents and Trademarks*

United States Patent [19]

Kasahara et al.

[11] Patent Number: 4,835,582

[45] Date of Patent: May 30, 1989

[54] DEVICE FOR DRIVING A PHOTOCONDUCTIVE ELEMENT OF AN ELECTROPHOTOGRAPHIC COPIER ETC.

[75] Inventors: Nobuo Kasahara; Toshio Nakahara, both of Yokohama, Japan

[73] Assignee: Ricoh Company, Ltd., Tokyo, Japan

[21] Appl. No.: 128,924

[22] Filed: Dec. 4, 1987

Related U.S. Application Data

[63] Continuation-in-part of Ser. No. 113,479, Oct. 28, 1987.

[30] Foreign Application Priority Data

Oct. 28, 1986 [JP] Japan .......................... 61-164184[U]
Dec. 5, 1986 [JP] Japan .......................... 61-186875[U]
Dec. 25, 1986 [JP] Japan .......................... 61-202741[U]

[51] Int. Cl.[4] ...................... H02K 5/24; G03G 15/00

[52] U.S. Cl. ................................ 355/3 DR; 310/51; 355/3 R

[58] Field of Search ............... 355/3 DR, 3 R, 3 DD; 310/51

[56] References Cited

U.S. PATENT DOCUMENTS 4,120,576 10/1978 Babish ............................ 355/3 DR
4,299,474 11/1981 Ernst et al. ...................... 355/3 DR
4,319,829 3/1982 Janeway, III et al. ...... 355/3 DR X
4,527,883 7/1985 Kamiyama ...................... 355/3 DR
4,714,337 12/1987 Nishino et al. ................. 355/3 DR

FOREIGN PATENT DOCUMENTS 117267 9/1981 Japan .............................. 355/3 DR
143368 8/1983 Japan .............................. 355/3 DR
250377 12/1985 Japan .............................. 355/3 DR

*Primary Examiner*—Arthur T. Grimley
*Assistant Examiner*—Edward Pipala
*Attorney, Agent, or Firm*—Oblon, Fisher, Spivak, McClelland & Maier

[57] ABSTRACT

A device for driving a photoconductive drum of an electrophotographic copier and others is operable without the need for gears, a toothed belt and other transmission mechanisms. An outer roller type drive motor is interposed between the drum and a drum support shaft such that an outer wheel portion of the motor drives the drum by way of an engaging member. Those members with which the body of the motor and that of the copier are engaged are made of a vibration-damping material. Tapered portions which are axially movable into and out of contact with each other are provided in a drive transmitting section with which an output portion of the motor and one end of the drum are engageable. Pressing means for causing one end of the drum into contact with the outer wheel portion of the motor through the tapered portions is provided at the other end of the drum.

26 Claims, 3 Drawing Sheets

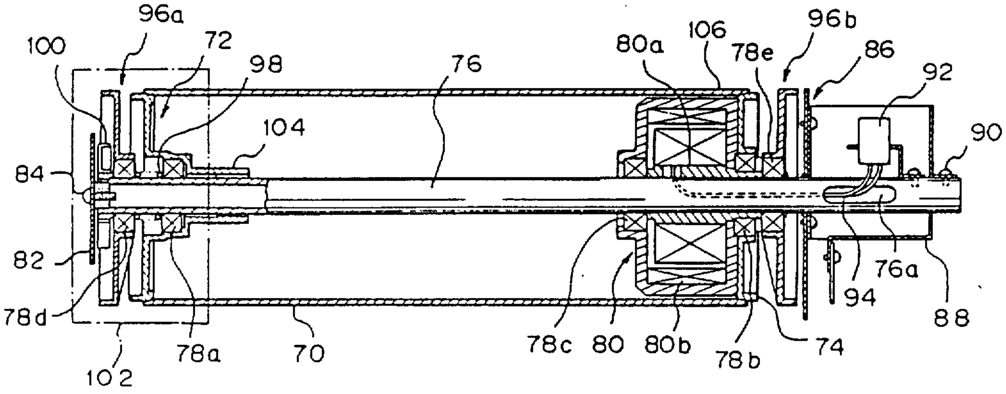

Fig. 1
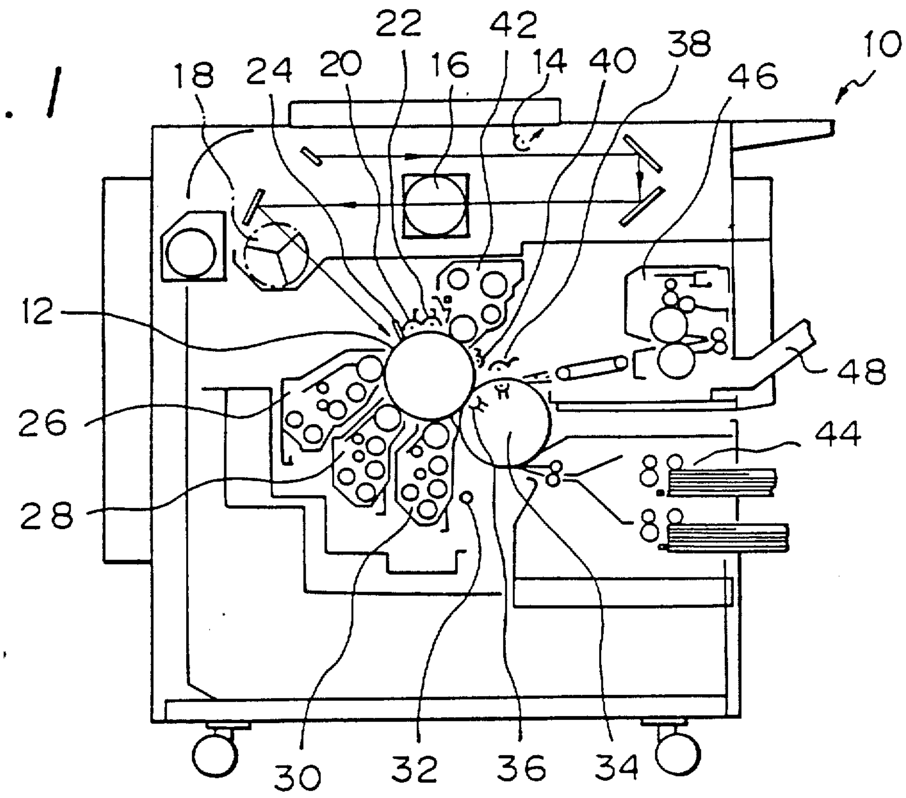
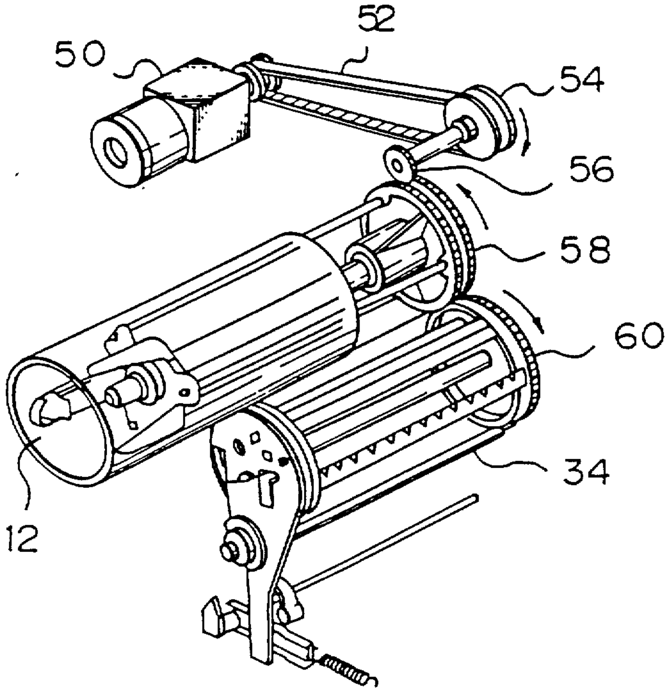
Fig. 2
PRIOR ART